(12) United States Patent
Engel et al.

(10) Patent No.: US 7,167,310 B2
(45) Date of Patent: Jan. 23, 2007

(54) MICROSCOPE, ESPECIALLY MICROSCOPE USED FOR INSPECTION IN SEMICONDUCTOR MANUFACTURE

(75) Inventors: Thomas Engel, Erfurt-Niedemissa (DE); Wolfgang Harnisch, Lehesten (DE); Roland Scheler, Jena (DE)

(73) Assignee: Carl Zeiss Jena GmbH, Jena (DE)

( * ) Notice: Subject to any disclaimer, the term of this patent is extended or adjusted under 35 U.S.C. 154(b) by 0 days.

(21) Appl. No.: 10/875,934

(22) Filed: Jun. 24, 2004

(65) Prior Publication Data

US 2004/0246574 A1 Dec. 9, 2004

Related U.S. Application Data

(63) Continuation of application No. 09/856,222, filed as application No. PCT/EP00/09199 on Sep. 20, 2000, now abandoned.

(30) Foreign Application Priority Data

Sep. 29, 1999 (DE) ................. 199 46 594

(51) Int. Cl.
*G02B 13/20* (2006.01)
*G02B 21/06* (2006.01)
*G02B 5/32* (2006.01)

(52) U.S. Cl. ............... 359/599; 359/385; 359/15; 359/707

(58) Field of Classification Search ........ 359/368–390, 359/599, 15, 27–28, 707; 356/495–511
See application file for complete search history.

(56) References Cited

U.S. PATENT DOCUMENTS

| | | | | |
|---|---|---|---|---|
| 3,490,827 A | * | 1/1970 | Snitzer et al. | 359/32 |
| 4,869,593 A | * | 9/1989 | Biegen | 356/495 |
| 5,233,460 A | * | 8/1993 | Partlo et al. | 359/247 |
| 5,365,354 A | * | 11/1994 | Jannson et al. | 359/15 |
| 5,534,386 A | * | 7/1996 | Petersen et al. | 430/320 |
| 5,737,072 A | * | 4/1998 | Emery et al. | 356/73 |
| 6,078,393 A | * | 6/2000 | Oohashi et al. | 356/511 |

FOREIGN PATENT DOCUMENTS

JP 10-078668 * 3/1998 ................. 359/599

OTHER PUBLICATIONS

XP-002160840—INSPEC Abstract of "Prbory 1 Teknhika Eksperimenta" vol. 33, No. 4, "Low-loss diffusing element for suppresion of spurious interference from laser illuminator" A.D. Kudanov et al.*
English translation of the Japanese reference No. 10-078668.*

* cited by examiner

Primary Examiner—Thong Q Nguyen
(74) Attorney, Agent, or Firm—Reed Smith LLP

(57) ABSTRACT

A microscope, especially a microscope that is used for inspection in semiconductor manufacture is disclosed. The microscope comprises a pulsed laser for the purpose of illumination, preferably in the UV range. At least one rotating diffusion disk is disposed downstream of the laser so as to homogenize the illumination. Preferably, two rotating diffusion disks of opposite rotational sense are disposed in the illumination beam path either directly or indirectly one behind the other.

8 Claims, 2 Drawing Sheets

MICROSCOPE, ESPECIALLY MICROSCOPE USED FOR INSPECTION IN SEMICONDUCTOR MANUFACTURE

CROSS-REFERENCE TO RELATED APPLICATIONS

This application is a continuation of U.S. application Ser. No. 09/856,222, filed Aug. 20, 2001, now abandoned which claims priority of International Application No. PCT/EP00/09199, filed Sep. 20, 2000 and German Application No. 199 46 594.0, filed Sep. 29, 1999, the complete disclosures of which are hereby incorporated by reference.

BACKGROUND OF THE INVENTION

Field of the Invention

The invention is directed to the coupling of pulsed laser radiation into a microscope, especially a microscope used for the quality control and classification of defects of masks for the manufacture of semiconductors.

SUMMARY OF THE INVENTION

In accordance with the invention, a microscope, especially for use during inspection in semiconductor manufacture comprising a pulsed laser for illumination, the laser being preferably in the UV range. The microscope includes at least one rotating diffusion disk which is arranged behind the laser for the homogenization of the illumination

DESCRIPTION OF THE PREFERRED EMBODIMENTS

Advantageously, a number of laser pulses are applied to the object to be examined while one image is taken. During this, intensity modulations of the laser profile of up to 40% can occur within one pulse or over a small number of pulses, which affects the evaluation.

Figure 1:
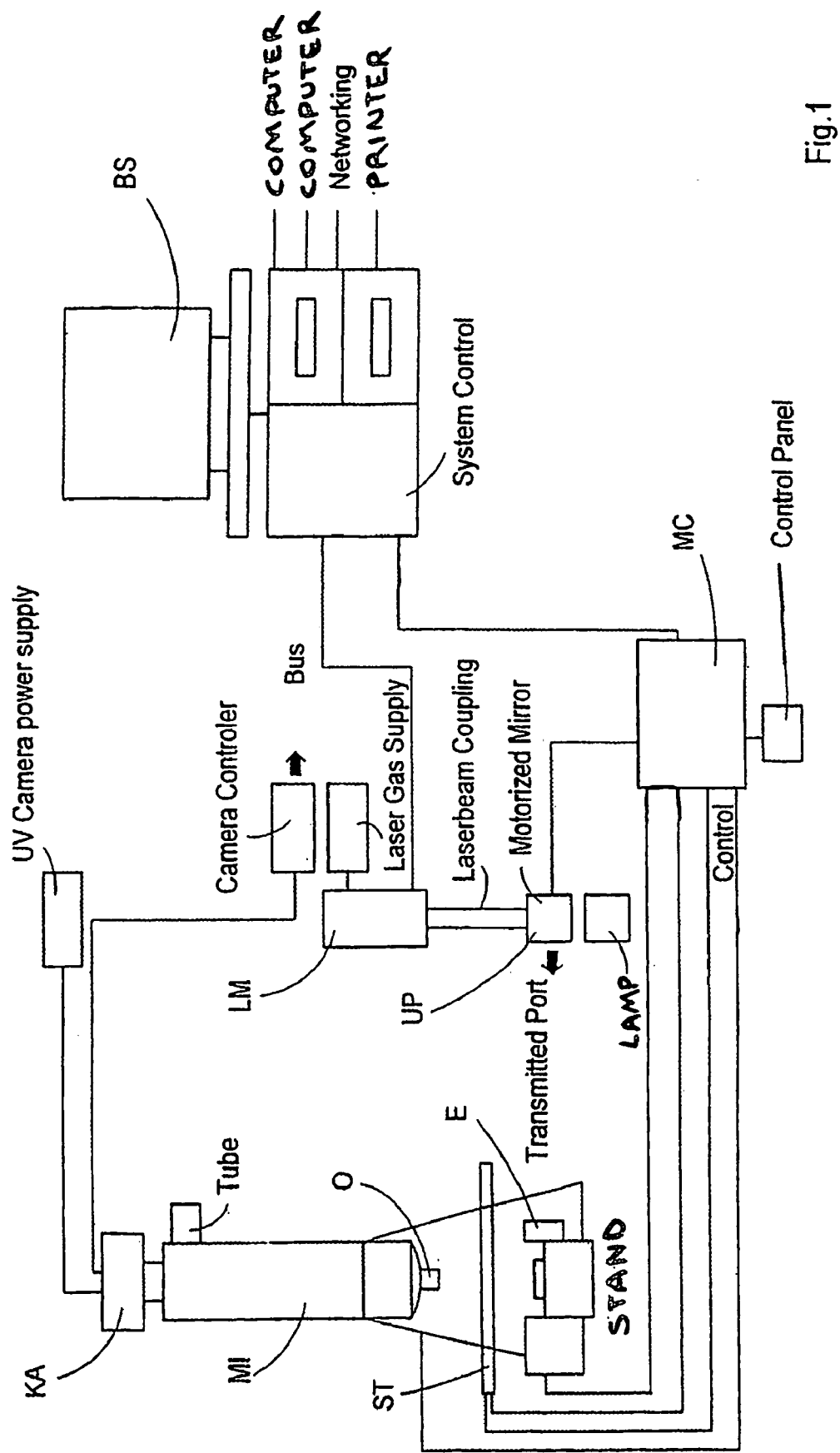
FIG. 1 shows an overall diagrammatic view of an inspection device using a microscope in accordance with the invention.

FIG. 1 shows an overall diagrammatic view of an inspection device consisting of a laser module LM with a pulsed UV laser, a transmitter port, a microscope MI with an objective O and a scanning table ST, a CCD camera KA, a screen BS and a microscope controller MC.

Figure 2A:
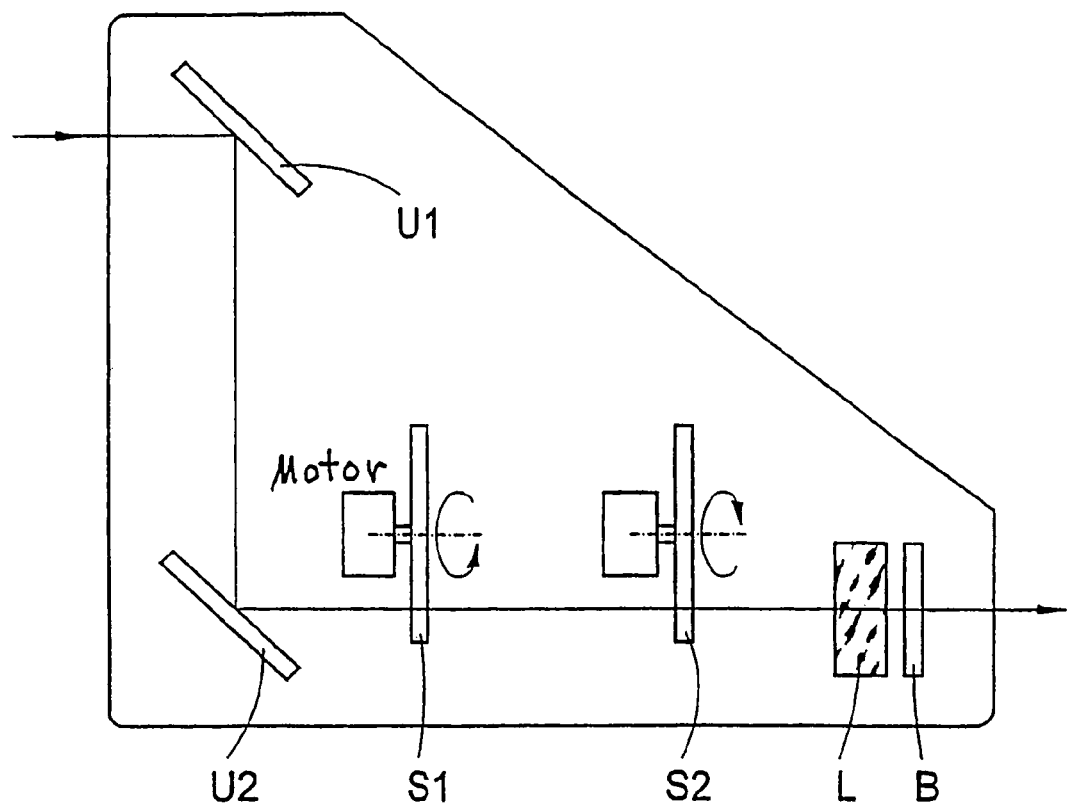
FIG. 2a shows a diagram of a coupling unit for coupling the laser beam into the microscope.
Figure 2B:
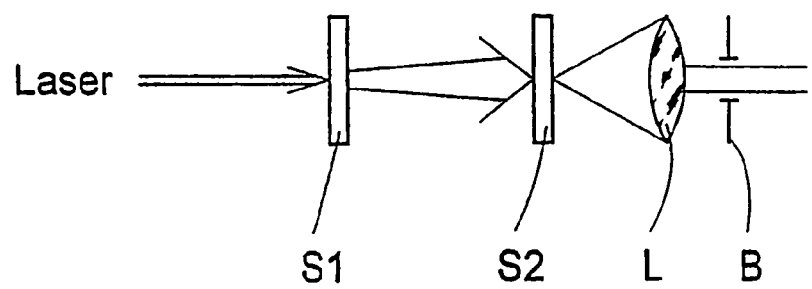
FIG. 2b is an additional view showing the coupling of the laser beam into the microscope.

FIGS. 2a and 2b show a coupling unit UP for coupling the laser beam into the microscope MI.

The laser light reaches a first rotating diffusion disk S1 via reflecting mirrors U1, U2 and then a second rotating diffusion disk S2 preferable rotating in the opposite direction as well as the microscope ray path (not shown) via a lens (L) for beam expansion and an aperture B and the input E in FIG. 1 and illuminates the object to be examined.

The laser profile is smoothed out by means of the at least one diffusion disk. As illustrated in FIGS. 2a and 2b, there is shown two diffusion disks rotating in opposite directions arranged directly or indirectly behind each other in an illumination ray path. It should be noted that the rotation speed of the diffusion disk is sufficiently fast to rotate by at least one grain size of the diffusion disk or by the resolution limit of a holographically generated structure between two laser pulses in one exemplary embodiment of the present invention.

The diffusion disk rotates at a speed which is relatively low when compared to the spacing of two laser pulses.

This means that the diffusion disk is practically not moving for the duration of a laser pulse of, for example, 10 ns, but also that it moves a bit further in the space of time between two laser pulses (for a repeating frequency of, for example, 200 Hz) before the next laser pulse occurs. It should also be noted that in one embodiment of the present invention, the illumination laser wavelength essentially corresponds to an illumination wavelength during the manufacture of semiconductors. In yet another embodiment of the present invention, the illumination wavelength is in the range of 193 nm or 248 nm or 266 nm or 366 nm, all with a tolerance of +/−2 nm.

This has the advantage of averaging out the granularity of the diffusion disk and furthermore that the granularity caused by the coherence of the laser radiation (speckle) is also averaged out.

This means that noise is reduced and an the image contrast is increased and that therefore image quality is improved.

For this, the magnitude of the rotating speed of the diffusion disk can lie in the easily realized range of approximately 1 rotation per second (a speed in the range of cm/s), so that for an assumed grain size of 0.1 mm a displacement by at least the size of one grain takes place between two pulses.

The homogenizing effect is reinforced by a second diffusion disk rotating in the opposite direction.

Besides granulated diffusion disks (made by etching or abrasive blasting), holographic disks can also be used.

CGHs (computer-generated holograms) can also be used for homogenization.

While the foregoing description and drawings represent the present invention, it will be obvious to those skilled in the art that various changes may be made therein without departing from the true spirit and scope of the present invention.

What is claimed is:

1. A microscope system for inspection during semiconductor manufacture comprising:
   a laser module having a pulsed laser for inspection illumination, said inspection illumination being in the ultraviolet range;
   a microscope;
   a coupling connecting the laser module to the microscope; and
   a first and a second rotating diffusion disks arranged behind the laser for the homogenization of the inspection illumination
   wherein the first and second rotating diffusion disk are either of a granulated or of a holographically produced design,
   wherein the first and second rotating diffusion disks rotate at a low speed when compared to the spacing of two laser pulses.

2. The microscope system according to claim 1, wherein the first and second rotating diffusion disks rotate in opposite directions arranged directly or indirectly behind each other in an illumination ray path.

3. The microscope system according to claim 1, wherein the rotation speed of the first and second rotating diffusion disk are sufficiently fast to rotate by at least one grain size of the diffusion disk or by the resolution limit of a holographically generated structure between two laser pulses.

4. The microscope system according to claim 1, wherein an illumination laser wavelength essentially corresponds to an illumination wavelength during the manufacture of semiconductors.

5. The microscope system according to claim 4, wherein the illumination wavelength is in the range of 193 nm or 248 nm or 266 nm or 366 nm, all with a tolerance of +/−2 nm.

6. An inspection device for use in semiconductor manufacture, comprising:
- a laser microscope having a pulsed laser operable to generate an inspection illumination in the ultraviolet range; and
- a first and second rotating diffusion disks arranged behind the laser for the homogenization of the inspection illumination
- wherein the first and second rotating diffusion disks are either of a granulated or of a holographically produced design
- wherein the first and second rotating diffusion disks rotate at a low speed when compared to the spacing of two laser pulses.

7. A microscope system for inspection of masks or processed wafers during semiconductor manufacture comprising:
- a laser module having a pulsed laser operable to generate an inspection illumination, said inspection illumination being in the ultraviolet range;
- a microscope;
- a coupling connecting the laser module to the microscope; and
- a first and second continuously rotating diffusion disks arranged behind the laser for the homogenization of the inspection illumination
- wherein the first and second rotating diffusion disks are either of a granulated or of a holographically produced design,
- wherein the first and second rotating diffusion disks rotate at a low speed when compared to the spacing of two laser pulses.

8. A microscope system for inspection of masks prior to a micro-lithography process using the masks comprising:
- a laser module having a pulsed laser operable to generate an inspection illumination for a mask, said inspection illumination being in the ultraviolet range;
- a microscope;
- a coupling connecting the laser module to the microscope; and
- a first and second continuously rotating diffusion disks arranged behind the laser for the homogenization of the illumination
- wherein the first and second rotating diffusion disks is are either of a granulated or of a holographically produced design,
- wherein the first and second rotating diffusion disks rotate at a low speed when compared to the spacing of two laser pulses.

* * * * *